Oct. 14, 1924.  
G. FIEDLER  
1,511,404
WEIGHING SCALE
Filed Jan. 4, 1923
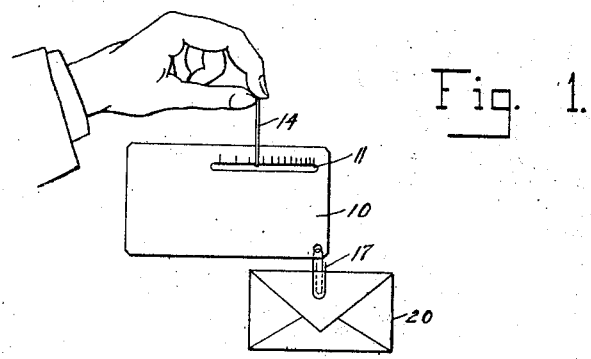
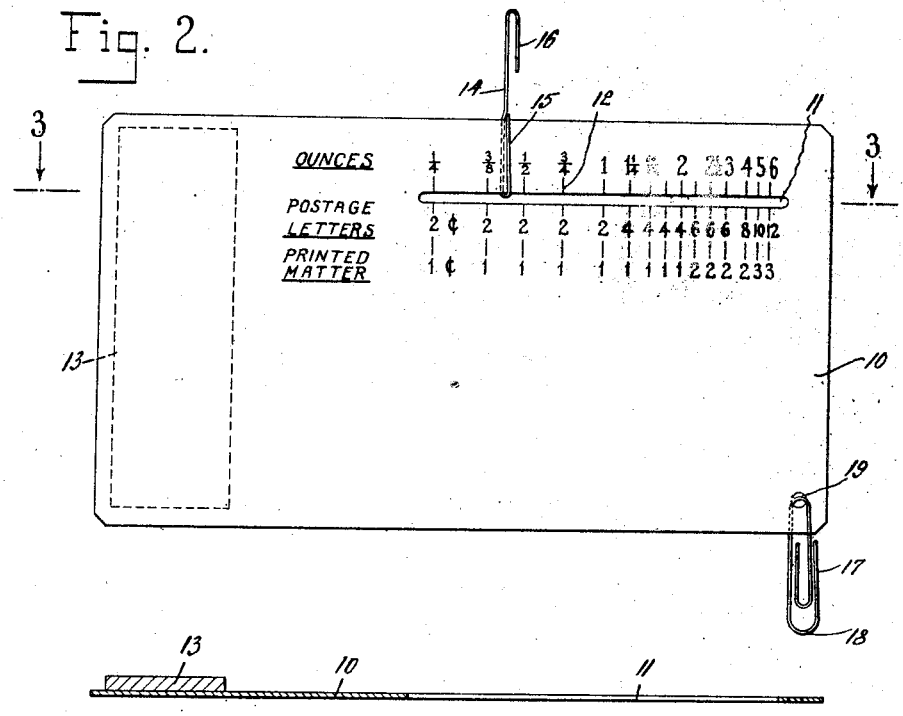
INVENTOR
G. Fiedler
BY
Sigmund Herzog
ATTORNEY Patented Oct. 14, 1924.

1,511,404

UNITED STATES PATENT OFFICE.

GUSTAV FIEDLER, OF NEW YORK, N. Y., ASSIGNOR TO G. M. FIEDLER MFG. CO., INC., OF NEW YORK, N. Y., A CORPORATION OF NEW YORK.

WEIGHING SCALE.

Application filed January 4, 1923. Serial No. 610,647.

*To all whom it may concern:*

Be it known that I, GUSTAV FIEDLER, a citizen of the United States, and resident of the city of New York, in the county of New York and State of New York, have invented certain new and useful Improvements in Weighing Scales, of which the following is a specification.

The present invention relates to improvements in weighing-scales, and more particularly to a scale especially adapted for weighing letters, etc., although not limited to that use.

The main object of the invention is to produce a weighing-scale that may be placed into an ordinary letter envelop and is thus capable of being carried along by the user.

Another object of the invention is to provide a scale of the character mentioned which is simple in construction, efficient in operation, durable in use and capable of manufacture on a commercial scale, or in other words one which is not so difficult to make as to be beyond the reasonable cost of such a contrivance.

A further object of the invention is to so construct the scale that, while accurately measuring the load to be weighed, contains a few simple parts only, which are not liable to get out of order.

With these and other objects in view, which will more fully apear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

Figure 1 is a diagrammatic view showing the method of operation of the improved scale; Fig. 2 is a front elevation of the scale; and Fig. 3 is a section taken on line 3—3 of Fig. 2.

The scale comprises a rigid sheet 10 of cardboard, iron or any other suitable material, the said sheet being, preferably, of oblong form, although this is not essential. This sheet constitutes the steelyard of the weighing apparatus, as will hereinafter appear, it being provided, preferably, adjacent its upper edge with a longitudinal slot 11, extending from adjacent one of its transverse edges to or beyond its transverse center line. Adjacent this slot, there is printed or otherwise provided upon one of the faces of the sheet a graduated scale 12 of weights. To the sheet is secured in any suitable manner a flat counterpoise 13, more particularly adjacent to that transverse edge of the sheet which is opposite to that transverse edge adjacent to which the slot 11 extends. In case the sheet 10 is made of cardboard, the poise 13 may be pasted to one of the faces thereof, preferably, the rear face, the main feature being that the said poise or weight be flat and immovably attached to the sheet. The sheet 10 is longitudinally slidable upon a supporting member 14, preferably, a piece of wire, one end of which is extended through the slot 11 and then bent back upon itself, as clearly shown at 15, while its other end is formed into hook-shape, as shown at 16. The body portion of the wire piece and the bent back portion 15 thereof are spaced, as clearly shown in Fig. 2 of the drawings, thereby permitting the sheet 10 to be slid back and forth on the support. The article or load to be weighed is engaged with a load holder 17, in the present case a paper clip 18 that extends through a perforation 19 in the sheet adjacent the lower longitudinal edge of the sheet and opposite to that transverse edge in the vicinity of which the poise 13 is attached to the sheet.

In operation, the load to be weighed, for instance a letter indicated in Fig. 1 of the drawings by the numeral 20, is engaged with the load holder 17 and the sheet 10 shifted on the support 14 until the said sheet, that is to say the steelyard of the scale, is balanced, when the position of the support 14 on the scale 12 indicates the weight of the letter. The support 14 has thus a two-fold function, that is to say it, first, serves as the fulcrum point of the steelyard and, second, it constitutes an indicator.

From the foregoing it appears that the scale herein described includes a steelyard, the load- and weight-arms of which are variable, in combination with a counterpoise that is immovably attached to the steelyard and is of a fixed weight. It also appears that all the elements of the scale are flat and can be easily placed into an envelop of ordinary letter size, to be carried along by the user.

What I claim is:—

A weighing-scale comprising a support, a steelyard longitudinally shiftable thereon having a graduated scale of weights in operative relation to said support, a counterpoise attached to said steelyard adjacent one of its ends, and a load holder fixed to the other end of said steelyard, said steelyard being in the form of a sheet of rigid material and said counterpoise comprising a flat weight upon one of the faces of said sheet.

Signed at New York, in the county of New York and State of New York, this 15th day of November, A. D. 1922.

GUSTAV FIEDLER.